US007453846B2

(12) United States Patent
Jang

(10) Patent No.: US 7,453,846 B2
(45) Date of Patent: Nov. 18, 2008

(54) METHOD FOR SHARING HYBRID RESOURCES IN A WIRELESS INDEPENDENT NETWORK, A STATION FOR THE METHOD, AND A DATA FORMAT FOR THE METHOD AND THE STATION

(75) Inventor: Kyung-hun Jang, Suwon (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1418 days.

(21) Appl. No.: 10/314,295

(22) Filed: Dec. 9, 2002

(65) Prior Publication Data
US 2003/0109259 A1 Jun. 12, 2003

(30) Foreign Application Priority Data
Dec. 12, 2001 (KR) ................. 2001-78664

(51) Int. Cl.
*H04Q 7/00* (2006.01)
(52) U.S. Cl. .............. 370/329; 370/445; 370/449; 370/450; 370/342; 370/348; 709/201; 709/223; 455/451; 455/452.1
(58) Field of Classification Search ........... 370/329, 370/328, 445, 449, 450
See application file for complete search history.

(56) References Cited

U.S. PATENT DOCUMENTS

| 6,138,235 | A  | * | 10/2000 | Lipkin et al. ............. 713/155 |
| 6,237,023 | B1 | * | 5/2001  | Yoshimoto ................ 709/203 |
| 6,246,702 | B1 |   | 6/2001  | Fellman et al. |
| 6,564,246 | B1 | * | 5/2003  | Varma et al. ............. 709/205 |
| 6,609,153 | B1 | * | 8/2003  | Salkewicz ................ 709/223 |
| 6,689,032 | B2 | * | 2/2004  | Mobius et al. ............ 493/23 |
| 6,747,968 | B1 | * | 6/2004  | Seppala et al. ........... 370/338 |
| 6,850,981 | B1 | * | 2/2005  | Ho et al. ................. 709/227 |
| 7,079,508 | B2 | * | 7/2006  | Ayyagari et al. .......... 370/329 |
| 7,095,754 | B2 | * | 8/2006  | Benveniste ............... 370/465 |
| 7,143,443 | B2 | * | 11/2006 | Song et al. ............... 726/29 |
| 7,274,677 | B1 | * | 9/2007  | Lewis .................... 370/330 |
| 7,298,691 | B1 | * | 11/2007 | Yonge et al. ............. 370/203 |
| 2004/0043780 | A1 | | 3/2004 | Sugaya et al. |

FOREIGN PATENT DOCUMENTS

EP          1 237 334 A2      9/2002
JP          61-158236         7/1986

(Continued)

*Primary Examiner*—Marceau Milord
(74) *Attorney, Agent, or Firm*—Lee & Morse, P.C.

(57) ABSTRACT

In a system for sharing hybrid resources in an independent network, each one of a plurality of stations preferably employs a sharing authority transferring protocol that allows the network control function to be moved from station to station depending on the network traffic. Although a distributed coordination method is normally used in the network, when an individual station determines that a real-time data stream is intended for the station, an apparatus having a method and data format for the use thereof allows control to be transferred to the targeted station. This allows the targeted station to control the sharing of the wireless hybrid resources using a centralized control method in a direct mode for the duration of the real-time service transmission, thereby optimizing network efficiency. As a result of using the distributed control authority of the present invention, a station may be freely subscribe/withdraw to/from the network.

16 Claims, 5 Drawing Sheets

FOREIGN PATENT DOCUMENTS

| | | |
|---|---|---|
| JP | 62-61442 | 3/1987 |
| JP | 2000-253017 | 9/2000 |
| JP | 2003-023434 | 1/2003 |
| JP | 2003-078531 | 3/2003 |
| JP | 2003-143159 | 5/2003 |
| KR | 2000-63196 | 11/2000 |
| WO | WO 02/06986 | 1/2002 |

* cited by examiner

FIG 6
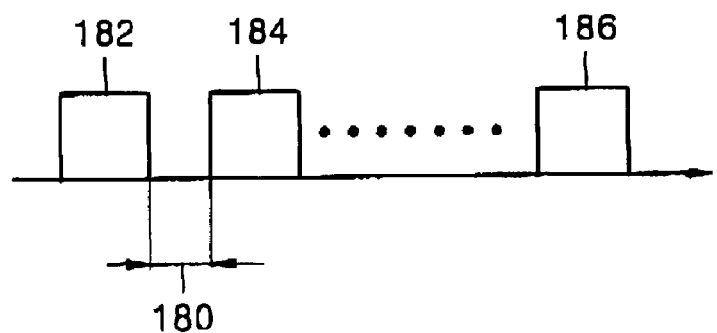
FIG. 7
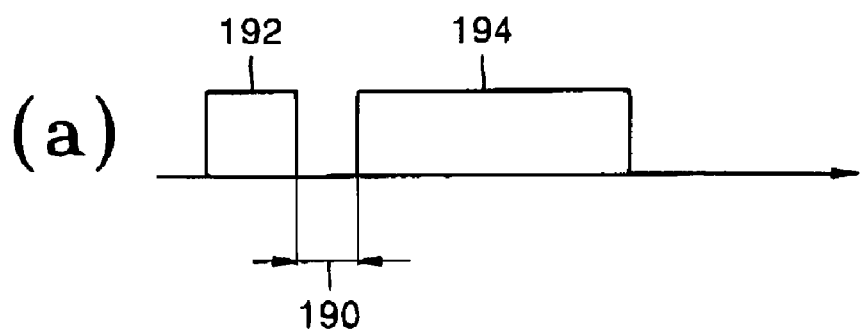
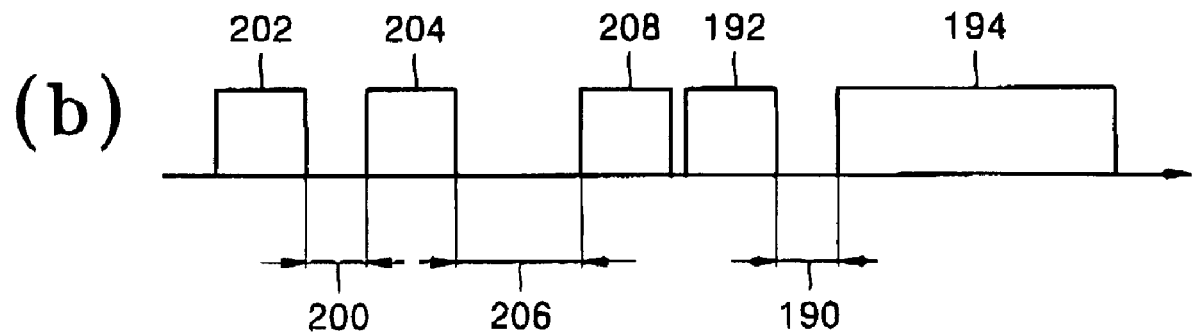

METHOD FOR SHARING HYBRID RESOURCES IN A WIRELESS INDEPENDENT NETWORK, A STATION FOR THE METHOD, AND A DATA FORMAT FOR THE METHOD AND THE STATION

BACKGROUND OF THE INVENTION

1. Field of the Invention

The present invention relates to a wireless independent network based on carrier sense multiplexing access (CSMA)/collision avoidance (CA). More particularly, the present invention relates to a method for sharing hybrid resources in a wireless independent network, a station for the method, and a data format for the method and the station.

2. Description of the Related Art

Wireless independent networks connect wireless stations without the use of wires in a predetermined area regardless of connections to base networks. For example, home networks connecting information regarding home electronics without the use of wires is a type of wireless independent network. Services in a wireless independent network may generally be classified into a real-time AudioVideo (AV) streaming service or a non-real-time AV streaming service.

An environment of such a wireless independent network may be characterized as follows. First, since network subscribers' interests concentrate on a real-time AV streaming service in one independent network, it is rare for a large number of real-time AV services to coexist in one independent network. Second, a small number of real-time AV streaming services and a large number of non-real-time AV streaming services can coexist in one independent network. Third, the real-time AV streaming service uses a station that is the subject thereof and limited holding time exists in the service.

In the above-described wireless independent network environment, wireless stations (STAs) typically share wireless communications resources. Here, a conventional resource-sharing method may generally be classified into a distributed coordination method or a centralized control method.

The distributed coordination method uses a mechanism for minimizing possible message collisions that occur when stations attempt to use a data channel simultaneously. This mechanism is the IEEE 802.11a distributed coordination function (DCF) based on CSMA/CA. In a distributed coordination method using a DCF, random backoff numbers are created to minimize competition-based collisions, the backoff numbers are reduced by stages when a channel is idle for at least a predetermined period of time (in the case of IEEE 802.11, this is referred to as DCF Interframe Space (DIFS)), and data is transmitted when the backoff number becomes "0". A conventional distributed coordination method for grading priorities of the occupation of resources according to a specific type of data includes a Point Coordination Function (PCF) Interframe Space (PIFS) system and a Short Interframe Space (SIFS). Priorities of these systems are in the relationship DIFS>PIFS>SIFS, and a station using SIFS has priority over a station using DIFS. However, since a DCF system works on a probabilistic base, it is still possible for stations to collide.

In the centralized control method, one control station controls resources shared in a wireless independent network in a bundle. Thus, wireless stations share wireless resources according to the instructions of the control station. The centralized control method may be subdivided into a direct mode and an indirect mode. In the direct mode, a control station controls the time slots for transmission and reception among wireless stations so that the wireless stations directly communicate with one another. The HiperLAN/2 standard is a representative example of the direct mode. In the indirect mode, transmission data of all stations is transmitted to the control station so that the wireless stations indirectly communicate with one another through the control station. This indirect mode is based on the Bluetooth standard.

Accordingly, in the above-described distributed coordination method, a specific control station is not required, and a mesh network can be constituted, and a station may easily subscribe to and withdraw from the mesh network. However, the distributed coordination method uses resources ineffectively and cannot support the real-time AV streaming service. In addition, the centralized control method in the indirect mode cannot support the real-time AV streaming service due to the forwarding of packets, which concentrates loading on the control station, and requires the selection of a substitute node when the control station withdraws from the subscribed network. Although the centralized control method in the direct mode uses resources effectively, supports the real-time AV streaming service, and constitutes the mesh network, loading is concentrated on the control station, thus requiring the selection of a substitute node when the control station withdraws from the subscribed network.

The aforementioned conventional resource-sharing methods have many problems since they have been developed based on non-real-time services, or due to inflexible structure of networks.

SUMMARY OF THE INVENTION

In an effort to solve the above-described problems, it is a first feature of an embodiment of the present invention to provide a method for sharing hybrid resources in a wireless independent network that can have the advantages of conventional resource-sharing methods by more efficiently analyzing the environment of the wireless independent network so that wireless resources are shared adaptive to the environment, thereby efficiently supporting real-time services as well as non-real-time services among the wireless stations.

It is a second feature of an embodiment of the present invention to provide stations performing the hybrid resources sharing method.

It is a third feature of an embodiment of the present invention to provide formats of data transmitted among the stations.

Accordingly, a method for sharing wireless hybrid resources among stations in a wireless independent network preferably includes analyzing a received data stream and obtaining network control for optimally transferring that data. An analysis is performed to determine whether currently transmitted data is related to a real-time service when the sharing of the wireless hybrid resources is controlled by a distributed coordination method. A sharing control authority is requested and received by the distributed coordination method, and the sharing of the wireless hybrid resources is controlled by a centralized control method in a direct mode until the real-time service ends if it is determined that the currently transmitted data is related to the real-time service. The sharing control authority corresponds to an authority which controls the sharing of the wireless hybrid resources. If it is determined that the currently transmitted data is not related to the real-time service, the sharing of the wireless hybrid resources may be controlled by the distributed coordination method.

Obtaining network control when the currently transmitted data is related to the real-time service preferably includes requesting the sharing control authority by the distributed coordination method if it is determined that the currently transmitted data is related to the real-time service; determining whether the request for the sharing control authority is rejected; controlling the sharing of the wireless hybrid resources with a request for periodic polling, if it is determined that the request is rejected; and then determining whether the sharing of the wireless hybrid resources does not need to be controlled during the real-time service. If it is determined that the sharing of the wireless hybrid resources does not need to be controlled during the real-time service, control is transferred to the aforementioned requesting step. If it is determined the sharing of the wireless hybrid resources still needs to be controlled during the real-time service, control is returned to the step for requesting for periodic polling.

If it is determined that the request for the sharing control authority is not rejected, the method preferably additionally includes receiving the sharing control authority and controlling the sharing of the wireless hybrid resources by the centralized control method in the direct mode; determining whether the real-time service ends and returning to the receiving step if it is determined that the real-time service does not end; and returning the sharing control authority if it is determined that the real-time service ends. In the foregoing additional steps, the sharing of the wireless hybrid resources is preferably controlled by the distributed coordination method.

A preferred embodiment of a station for performing the wireless hybrid resources sharing method according to the present invention preferably includes a transmission data checking unit and a first controller. The preferred embodiment of the station may further include a second controller. The transmission data checking unit checks whether the currently transmitted data is related to the real-time service and generates a control signal in response to the check result. In response to the control signal, the first controller requests and receives the sharing control authority by the distributed coordination method and controls the sharing of the wireless hybrid resources by the centralized control method in the direct mode until the real-time service ends. Alternately, a second controller may control the sharing of the wireless hybrid resources by the distributed coordination method in response to the control signal.

The first controller preferably further includes a request message broadcaster, which broadcasts a control authority requesting message requesting the sharing control authority by the distributed coordination method in response to the control signal and an enable signal; a request rejecting message receiver, which receives a control authority request rejecting message rejecting the request for the sharing control authority and outputs a disable signal in response to the received result; a polling requesting unit, which requests periodic polling in response to the disable signal and the enable signal; a releasing message receiver, which receives a control authority releasing message in response to the control signal and outputs the enable signal in response to the received result; a shared resource controller, which receives the sharing control authority in response to the disable signal and controls the sharing of the wireless hybrid resources by the centralized control method in the direct mode and transmits the sharing control authority releasing message to another station and returns the sharing control authority in response to an ending signal; and a service checking unit, which checks whether the real-time service ends and outputs the checked result as the ending signal. Preferably, a second controller controls the sharing of the wireless hybrid resources by the distributed coordination method in response to the ending signal.

To operate the foregoing preferred station using the foregoing preferred method for sharing wireless hybrid resources, a data format preferably includes a control authority requesting message, a control Authority releasing message, and a plurality of transmission frames located therebetween. The control authority requesting message requests the sharing control authority by the distributed coordination method. The control authority releasing message releases the sharing control authority. The plurality of transmission frames are spaced apart from the control authority requesting message and the control authority releasing message, by a PIFS, are also spaced apart from each other by one PIFS, and may have variable lengths.

Each one of the plurality of transmission frames preferably further includes a downlink section in which the real-time service-related data is transmitted to another station and which may have a variable length; a polling section in which the other stations related to the real-time service is polled and which has a variable length; and a distribution control section in which non-real-time service-related data is transmitted to another station and which may have a variable length. The downlink section is preferably spaced apart from the polling section by a PIFS. The polling section is preferably spaced apart from the distribution control section by a DIFS. The downlink section preferably includes a plurality of packets which are spaced apart from each other by a PIFS.

In the event that a share request rejection message is received in the station, a sharing control authority message may also be received. In such a case, the shared resource controller is preferably idle for a PIFS period, thereby necessitating the inclusion of a PIFS time period between the time of the request for sharing control authority and the receipt of the sharing control authority. Additionally, in the event a sharing rejection message is transmitted by the sharing controller, preferably a SIFS time period is included in the format between the time of transmission of the request and the time of receipt of the rejection message.

BRIEF DESCRIPTION OF THE DRAWINGS

The above and other features and advantages of the present invention will become readily apparent to those of ordinary skill in the art by describing in detail preferred embodiments thereof with reference to the attached drawings in which:

FIG. 6 illustrates an exploded view of a preferred embodiment of a downlink section shown in FIG. 5(c); and FIGS. 7(a) and (b) illustrate how the sharing control authority is obtained and how a message rejecting the request for the sharing control authority is received from a control station, respectively, after a message requesting a sharing control authority is broadcasted.

DETAILED DESCRIPTION OF THE INVENTION

Figure 1:
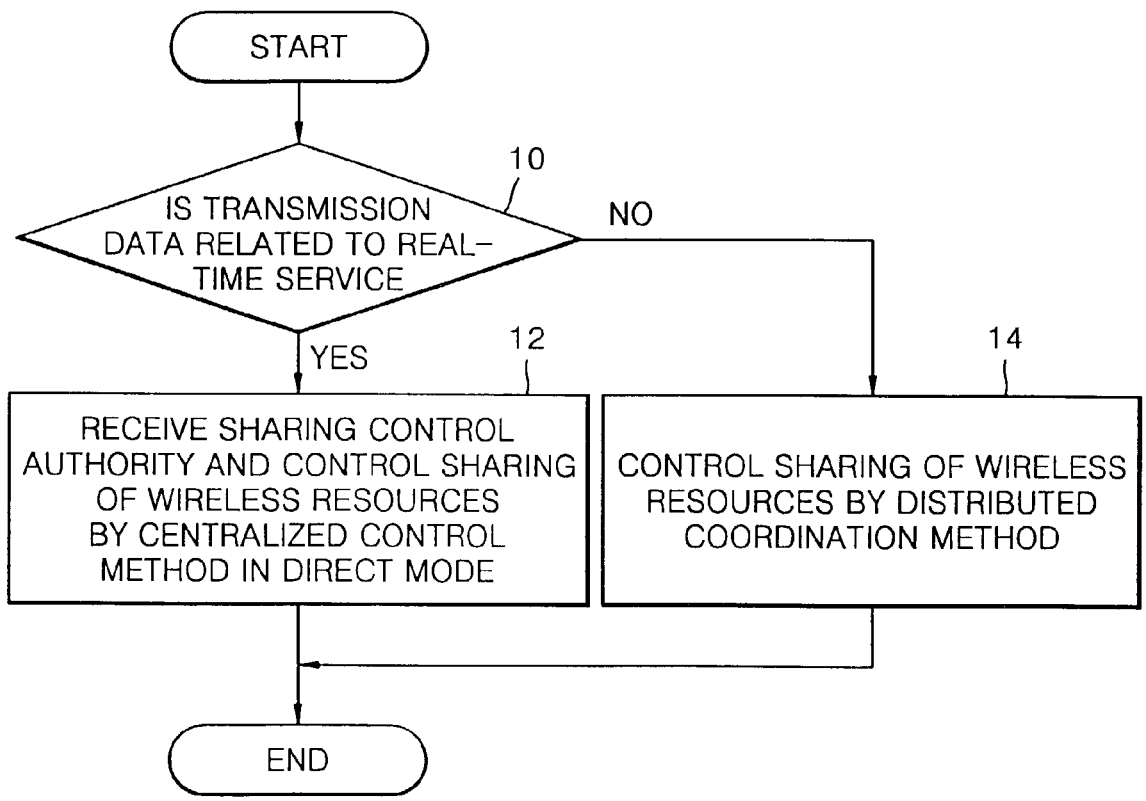
FIG. 1 illustrates a flowchart of a method for sharing hybrid resources in a wireless independent network according to the present invention.

Korean Patent Application No. 2001-78664, filed Dec. 12, 2001, and entitled: "Method for Sharing Hybrid Resources in Wireless Independent Network, Station for the Method, and Data Format for the Method and the Station," is incorporated by reference herein in its entirety.

Hereinafter, a method for sharing hybrid resources in a wireless independent network according to the present invention will be described with reference to the attached drawings. In the drawings, like reference numerals refer to like elements throughout.

FIG. 1 illustrates a flowchart of a preferred method for sharing hybrid resources in a wireless independent network according to the present invention. Selection of either a centralized control method in a direct mode or a distributed coordination method is preferably dependent on whether real-time service-related data is transmitted. In step 10, a determination is made as to whether currently transmitted data is related to a real-time service when the sharing of the wireless resources is controlled based on the above-described distributed coordination method. For example, it may be determined that a real-time AV streaming service is being generated, i.e., the real-time AV streaming service is provided via a wireless independent network. If the currently transmitted data is not related to the real-time service, the distributed coordination method is retained in step 14.

If, however, the currently transmitted data is related to the real-time service when the sharing of the wireless resources is controlled by the distributed coordination method, in step 12, a station which is the subject of the real-time service (hereinafter referred to as "subject station") requests a sharing control authority using the distributed coordination method. After the request is admitted sharing control authority is granted to the subject station, and wireless resources are shared under control of the subject station preferably using the centralized control method in a direct mode for the duration of the transmission of the corresponding real-time service. At the completion of the real-time service transmission the subject station restores the sharing of the wireless resources to the distributed coordination method.

Figure 2:
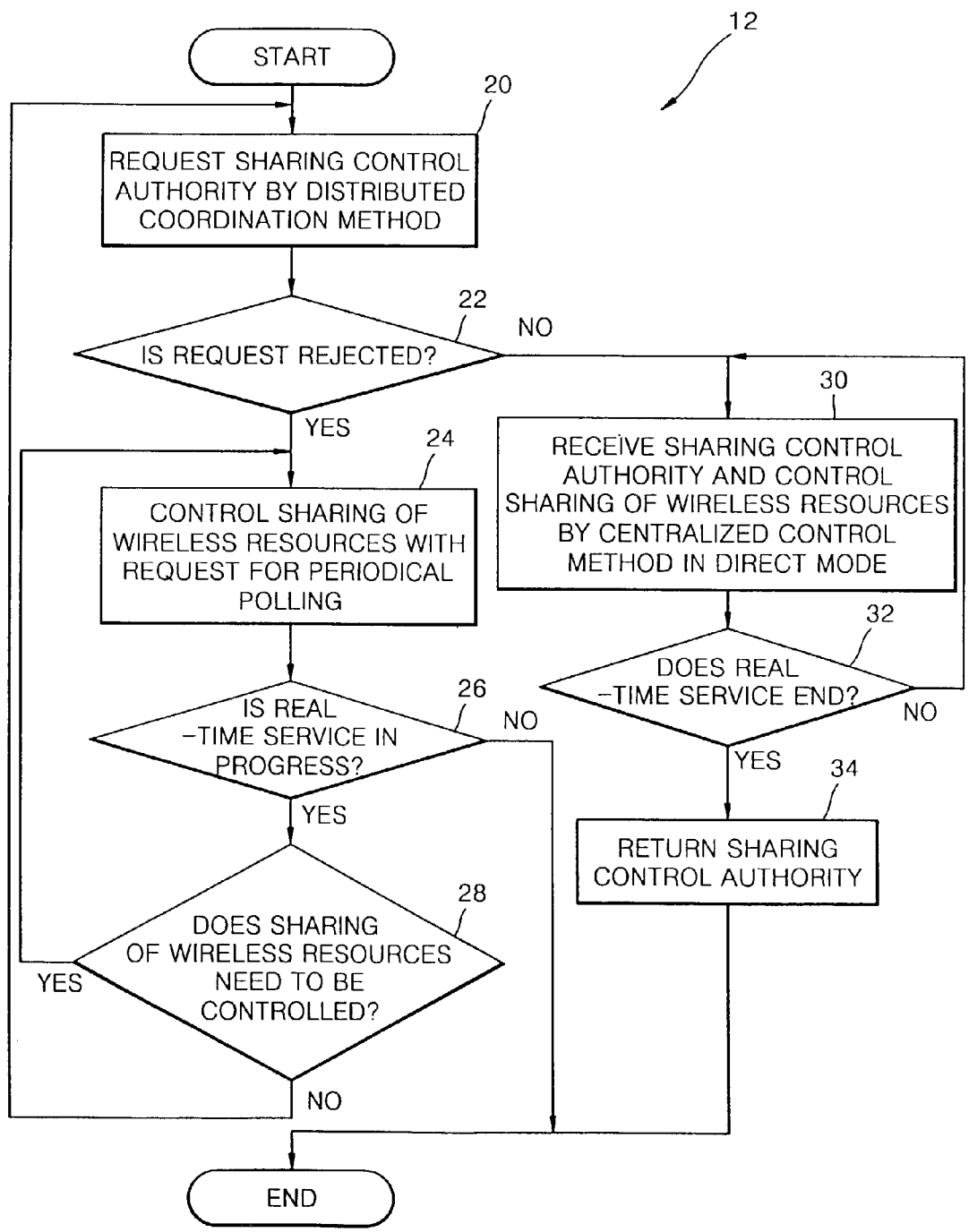
FIG. 2 illustrates a flowchart of a preferred embodiment of step 12 shown in FIG. 1 according to the present invention.

FIG. 2 illustrates a flowchart of a preferred embodiment of step 12 shown in FIG. 1 according to the present invention. Step 12 preferably includes steps 20 and 22 for requesting the sharing control authority, steps 24 through 28 for controlling the sharing of wireless resources with a request for periodic polling when the requested sharing control authority is rejected, and steps 30 through 34 for controlling the sharing of the wireless resources by the centralized control method in the direct mode until the real-time service ends when the requested sharing control authority is admitted.

After it is determined that the currently transmitted data is related to the real-time service, in step 20 the subject station requests the sharing control authority using the distributed coordination method, e.g., a DCF system. In step 22, the subject station determines whether the request for sharing control authority has been rejected. In other words, the subject station determines whether a station currently having a sharing control authority (hereinafter referred to as a "control station") exists by testing for the existence of a "rejection message" from that control station.

If it is determined that the request for the sharing control authority is rejected, in step 24 the sharing of the wireless resources is controlled while the subject station requests the control station for periodic polling. For example, if the control station exists, the subject station cannot be granted the sharing control authority, and the control station maintains the sharing control of the wireless resources and a corresponding real-time AV streaming service-related communication is implemented using the existing method.

In step 26 the subject station determines whether the real-time service is still being transmitted, i.e., still in progress. If it is determined that the real-time service is still being transmitted, in step 28 the subject station determines whether the sharing of the wireless resources needs to be controlled. In other words, if it has been determined that the real-time service is in process, the subject station monitors whether a control authority releasing message has been received from the control station.

If it is determined through the periodic polling that the sharing of the wireless resources does not need to be controlled by the control station for performing the corresponding real-time service-related communication, the process returns to step 20. In other words, when the subject station does not need to be controlled by the control station any more, it requests the acquisition of the sharing control authority by the distributed coordination method again. However, if it is determined that the subject stations still needs to be controlled by the control station to share the wireless resources when the real-time service is in progress, the process returns to step 24.

Alternatively, if it is determined that the request for the sharing control authority has not been rejected, in step 30 the subject station is granted (i.e., assumes or seizes) the sharing control authority and preferably controls the sharing of the wireless resources by the centralized control method in the direct mode. In step 32, it is determined whether the real-time service has ended. If it is determined that the real-time service has not ended, the process repeats step 30, such that the subject station retains the sharing control authority. However, if it is determined that the real-time service has ended, in step 34 the subject station broadcasts a new control authority releasing message to the other stations to return the sharing control authority to the network. When it is determined that the real-time service is not in progress in step 26 or after step 34, the subject station changes the sharing controls back to the distributed coordination method.

A preferred embodiment according to the present invention, showing the structure and operation of stations in an independent network performing the previously described hybrid resources sharing method will be described with reference to FIGS. 3 and 4.

Figure 3:
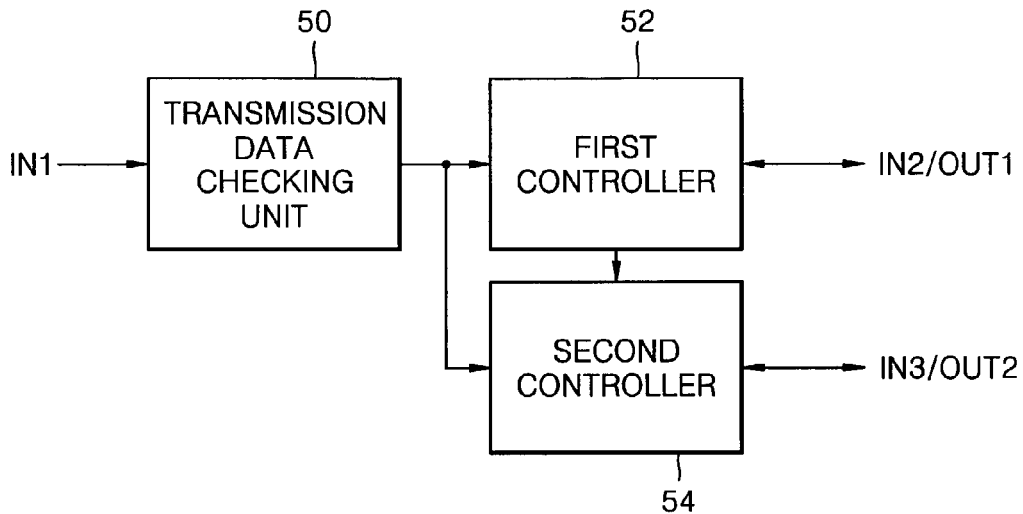
FIG. 3 illustrates a block diagram of a station, according to the present invention, performing the hybrid resources sharing method shown in FIG. 1.

FIG. 3 illustrates a block diagram of a station for performing the hybrid resources sharing method shown in FIG. 1, according to an embodiment of the present invention. The station preferably includes a transmission data checking unit 50, and a first and a second controller 52 and 54, respectively. For a better understanding of the present invention, the structure and operation of the station shown in FIG. 3 will be described assuming that the station is a subject station.

The transmission data checking unit 50 checks whether currently transmitted data input via an input port IN1 is related to a real-time service and outputs a control signal to first and second controllers 52 and 54, respectively. First and second controllers 52 and 54 generate output control and data signals in response to the check result.

If first controller 52 is granted a sharing control authority in response to the control signal input from the transmission data checking unit 50, the sharing of wireless resources on a central controls system in a direct mode is controlled by first controller 52 until the real-time service ends. To perform this control function, if it is perceived through the control signal that data input via the input port IN1 is transmission data for the real-time service, the first controller 52 outputs a signal requesting the sharing control authority to the other stations via an output port OUT1 and checks whether a message rejecting the request for the sharing control authority is received from another station, e.g., a control station (not shown), via the input port IN1. If the first controller 52 is granted the sharing control authority (i.e., not rejected) data input through the input port IN1 via the transmission data checking unit 50 is transmitted to a corresponding station (not shown) via the output port OUT1.

The second controller 54 controls the sharing of the wireless resources by the distributed coordination method in response to the control signal input from the transmission data checking unit 50. Here, the second controller 54 preferably receives data from another station via an input port IN3 and outputs the data input through the input port IN1 via the transmission data checking unit 50 to another station via an output port OUT2. Here, the second controller 54 may control the sharing of the wireless resources by the distributed coordination method in response to an ending signal generated when the real-time services ends in the first controller 52.

Figure 4:
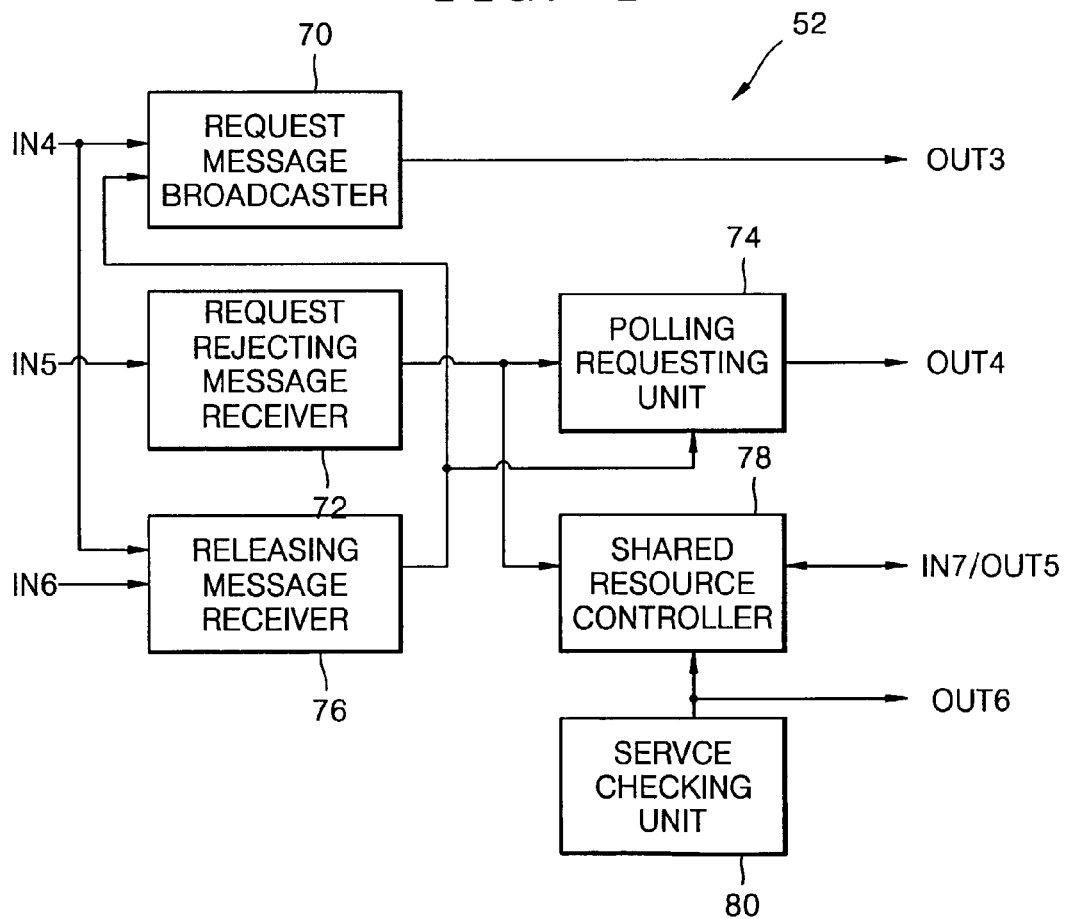
FIG. 4 illustrates a block diagram of a preferred embodiment of a first controller shown in FIG. 3 according to the present invention.

FIG. 4 illustrates a block diagram of a preferred embodiment of the first controller 52 shown in FIG. 3. The first controller 52 preferably includes a request message broadcaster 70, a request rejecting message receiver 72, a polling requesting unit 74, a releasing message receiver 76, a shared resource controller 78, and a service checking unit 80.

To perform step 20, in response to the control signal from transmission data checking unit 50 via an input port IN4 (indicating that received data is related to a real-time service,) the request message broadcaster 70 transmits a message requesting control authority to the other stations via an output port OUT3 using the distributed coordination method. The request message is additionally gated using an enable signal input from the releasing message receiver 76. If one of the other stations has sharing control authority (i.e., is processing data), that "control station" transmits a rejection message to the subject station. When the control station has completed its data processing activity, it transmits a sharing control authority releasing message using the distributed coordination method. If, however, there is no current control station, no rejection message will be received.

To perform step 22, the request rejecting message receiver 72 receives any message rejecting the request for the sharing control authority via an input port IN5 and outputs the received message as a disable signal to the polling requesting unit 74 and the shared resource controller 78. In response to the disable signal from the request rejecting message receiver 72 and the enable signal input from the releasing message receiver 76, the polling requesting unit 74, which performs step 24, requests the periodic polling from the control station via an output port OUT4. In other words, the polling requesting unit 74 requests the periodic polling of the control station whenever a rejection message is received and the sharing control authority releasing message has not yet been received.

To perform steps 26 and 28, in response to the control signal input from the transmission data checking unit 50 via the input port IN4 (indicating the real-time service) the releasing message receiver 76 monitors the control station for the sharing control authority releasing message via an input port IN6. When the sharing control authority releasing message is received, releasing message receiver 76 outputs an enable signal to the request message broadcaster 70 and the polling requesting unit 74. The releasing message receiver 76 may generate an enable signal having a first logic level if the sharing control authority releasing message is received from the control station and an enable signal having a second logic level if the control authority releasing message is not received from the control station.

For the case where no rejection message is received, the shared resource controller 78, which performs steps 30 and 34, assumes the sharing control authority in response to the disable signal input from the request rejecting message receiver 72 and thus controls the sharing of the wireless resources using the centralized control method in the direct mode. Here, the shared resource controller 78 may receive data from another station via an input port IN7 or may output data for the real-time service to another station via an output port OUT5. Also, in step 34, the shared resource controller 78 preferably transmits the sharing control authority releasing message to another station via the output port OUT5 to return the sharing control authority in response to the ending signal input from the service checking unit and sharing control authority 80. Although it is not shown as a step in FIG. 2, during the time that the subject station has the control authority, the shared resource controller 78 preferably transmits the sharing control rejection messages upon being queried by other stations.

The service checking unit 80, which performs step 32, checks whether the real-time service has ended and outputs the check result as the ending signal to the shared resource controller 78 and to the second controller 54 via the output port OUT6. Here, the second controller 54 controls the sharing of the wireless resources by the distributed coordination method in response to the ending signal input from the service checking unit 80.

Hereinafter, a data format for the hybrid resource-sharing method and the station according to the present invention will be described with reference to the attached drawings.

Figure 5:
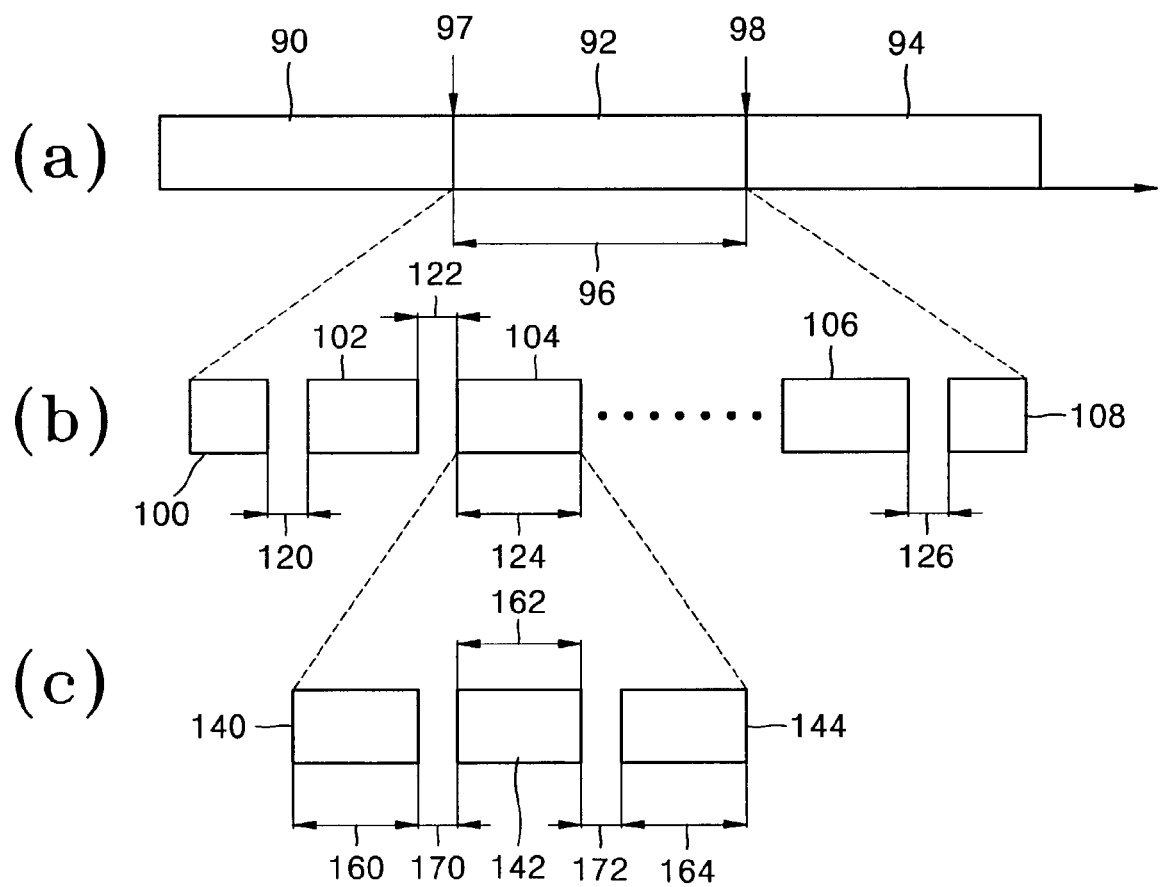
FIGS. 5(a), (b), and (c) illustrate data formats for the above-described hybrid resources sharing method and the station according to the present invention.

FIGS. 5(*a*), (*b*), and (*c*) illustrate a timing diagram of a streaming messaging signal having a plurality of partitioning sections according to a preferred data format for the above-described resource-sharing method and station according to the present invention. FIG. 5(*a*) shows sections of the complete data stream and FIGS. 5(*b*) and 5(*c*) show exploded views of the partitions of a transmission frame.

According to the present invention, step 10 of the preferred method shown in FIG. 1 is performed by a distributed coordination method during section 90 shown in FIG. 5(*a*). Here, if it is determined that currently transmitted data is related to the real-time service, step 12 is performed during an adaptive control method section 92 shown in FIG. 5(*a*). For this, the subject station obtains the sharing control authority at a starting point 97 of the adaptive control system section 92. The length 96 of the adaptive control system section 92 may vary. When the real-time service ends during step 12, the subject station returns the sharing control authority at an ending point 98 of the adaptive control system section 92.

As shown in FIG. 5(*b*), the adaptive control system section 92 shown in FIG. 5(*a*) preferably includes a control authority requesting message 100, a series of first through n-th transmission frames 102, 104, . . . and 106, and a control authority releasing message 108. The first transmission frame 102 is spaced apart from the control authority requesting message 100 by a Point Coordination Function (PCF) Interframe Space (PIFS) 120 and the n-th transmission frame 106 is spaced apart from the control authority releasing message 108 by a PIFS 126. The first through n-th transmission frames 102, 104, . . . , and 106 are spaced apart from each other by a PIFS 122 to have priority of the occupation of the resources over DCF-based wireless stations. Here, the first through n-th transmission frames 102, 104, . . . and 106 have lengths 124, respectively, which may vary depending on characteristics of a corresponding AV streaming service.

As shown in FIG. 5(c), each one of the first through n-th transmission frames 102, 104, . . . and 106 preferably includes a downlink section 140, a polling section 142, and a distribution control section 144. In the downlink section 140, real-time service-related transmission data is transmitted to another station and the downlink section 140 has a variable length 160. In the polling section 142, which has a variable length 162, other real-time service-related stations may be polled, and a multiplex polling system may be used for improved performance. In the polling section 142, a packet is forwarded from the subject station to the control station or another station.

In the distribution control section 144, which has a variable length 164, non-real-time service-related transmission data is preferably transmitted to another station using a DCF system. If an additional real-time AV streaming service is generated, the message requesting the periodic polling may be transmitted to the control station. Here, the downlink section 140 is spaced apart from the polling section 142 by a PIFS 170, and the polling section 142 is spaced apart from the distribution control section 144 by a DIFS 172.

FIG. 6 illustrates an exploded view of a preferred embodiment of the downlink section 140 of FIG. 5(c) according to the present invention, which preferably includes a plurality of packets 182, 184, . . . and 186. Referring to FIG. 6, the plurality of packets 182, 184, . . . and 186 are spaced apart from each other by a PIFS 180 to maintain the sharing control authority for the downlink section 140.

FIGS. 7(a) and (b) illustrate views explaining how the sharing control authority is obtained and how the message rejecting the request for the sharing control authority is received from the control station, respectively, after the message requesting the sharing control authority has been transmitted. In FIG. 7(a), there is no current control station, while in FIG. 7(b), there is a current control station.

As shown in FIG. 7(a), the request message broadcaster 70 transmits a control authority requesting message 192 via the output port OUT3. After the shared resource controller 78 shown in FIG. 4 is idle for a PIFS 190, sharing control authority is assumed in section 194.

For the case where an active control station exists, as shown in FIG. 7(b), the request message broadcaster 70 broadcasts a control authority requesting message 202. Then after a SIFS 200 elapses, the request rejecting message receiver 72 shown in FIG. 4 receives a control authority request rejecting message 204 from the active control station. After a variable time duration 206 during which the active control station completes its control task, a sharing control authority releasing message 208 is transmitted by the active control station, thereby releasing network sharing control authority.

At this time the request message broadcaster 70 again transmits a control authority requesting message 192 as in FIG. 7(a), and after the shared resource controller 78 is idle for a PIFS 190, sharing control authority is assumed in section 194. In an alternate embodiment, the active control station may transmit the sharing control authority releasing message 208 directly to the requesting station, thereby allowing the requesting station to immediately assume sharing control authority in section 194, and thus avoiding the loss of time periods 190 and 192.

As described above, in a preferred method for sharing hybrid resources in a wireless independent network, a station for the method, and a data format for the method and the station, non-real-time service-related data packets are transmitted/received using a distributed coordination method and real-time service-related data packets are transmitted/received using a centralized control method in a direct mode. In other words, hybrid data is transmitted and received in a wireless independent network. Thus, an efficiency of using resources is maximized, a real-time service of the resources is supported, and a mesh network may be constituted. Further, loading may be prevented from concentrating in a control station and the control station is not fixed. As a result, a station can freely subscribe/withdraw to/from a subscribed network.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method for sharing wireless hybrid resources among stations in a wireless independent network, the method comprising:
   (a) determining whether currently transmitted data is related to a real-time service when the sharing of the wireless hybrid resources is controlled by a distributed coordination method;
   (b) requesting and receiving a sharing control authority by the distributed coordination method, and controlling the sharing of the wireless hybrid resources by a centralized control method in a direct mode until the real-time service ends if it is determined that the currently transmitted data is related to the real-time service,
   wherein the sharing control authority corresponds to an authority which controls the sharing of the wireless hybrid resources.

2. The method as claimed in claim 1, further comprising (c) controlling the sharing of the wireless hybrid resources by the distributed coordination method if it is determined that the currently transmitted data is not related to the real-time service.

3. The method as claimed in claim 1, wherein (b) comprises:
   (b1) requesting the sharing control authority by the distributed coordination method if it is determined that the currently transmitted data is related to the real-time service;
   (b2) determining whether the request for the sharing control authority is rejected;
   (b3) controlling the sharing of the wireless hybrid resources with a request for periodic polling, if it is determined that the request is rejected;
   (b4) determining whether the sharing of the wireless hybrid resources does not need to be controlled during the real-time service, going back to step (b1) if it is determined that the sharing of the wireless hybrid resources does not need to be controlled during the real-time service, and going back to step (b3) if it is determined the sharing of the wireless hybrid resources still needs to be controlled during the real-time service;
   (b5) receiving the sharing control authority and controlling the sharing of the wireless hybrid resources by the centralized control method in the direct mode if it is determined that the request for the sharing control system is not rejected;
   (b6) determining whether the real-time service ends and going back to step (b5) if it is determined that the real-time service does not end; and (b7) returning the sharing control authority if it is determined that the real-time service ends, wherein the sharing of the wireless hybrid resources is controlled by the distributed coordination method.

4. The method as claimed in claim 1, wherein:
(a) further comprises identifying a station subject to the real-time service as a subject station; and
(b) comprises requesting and receiving the sharing control authority by the subject station in accordance with the distributed coordination method, and controlling the sharing of the wireless hybrid resources by the subject station in accordance with the centralized control method in the direct mode until the real-time service ends if it is determined that the currently transmitted data is related to the real-time service.

5. The method as claimed in claim 4, wherein the subject station receives the sharing control authority when no other station in the wireless independent network has the sharing control authority.

6. A station for performing the wireless hybrid resources sharing using a method for sharing wireless hybrid resources among stations in a wireless independent network, the station comprising:
a transmission data checking unit configured to check whether currently transmitted data is related to a real-time service and to generate a control signal in response to the check result; and
a first controller configured to request and receive a sharing control authority by a distributed coordination method and to control sharing of the wireless hybrid resources by a centralized control method in the direct mode until the real-time service ends, in response to the control signal.

7. The station as claimed in claim 6, further comprising a second controller which controls the sharing of the wireless hybrid resources by the distributed coordination method in response to the control signal.

8. The station as claimed in claim 6, wherein the first controller comprises:
a request message broadcaster, which broadcasts a control authority requesting message requesting the sharing control authority by the distributed coordination method in response to the control signal and an enable signal;
a request rejecting message receiver, which receives a control authority request rejecting message rejecting the request for the sharing control authority and outputs a disable signal in response to the received result;
a polling requesting unit, which requests periodic polling in response to the disable signal and the enable signal;
a releasing message receiver, which receives a control authority releasing message in response to the control signal and outputs the enable signal in response to the received result;
a shared resource controller, which receives the sharing control authority in response to the disable signal and controls the sharing of the wireless hybrid resources by the centralized control method in the direct mode and transmits the sharing control authority releasing message to another station and returns the sharing control authority in response to an ending signal; and
a service checking unit, which checks whether the real-time service ends and outputs the checked result as the ending signal,
wherein a second controller controls the sharing of the wireless hybrid resources by the distributed coordination method in response to the ending signal.

9. The data format as claimed in claim 8, wherein after the request message broadcaster broadcasts the sharing control authority requesting message, the shared resource controller is idle for a PIFS and then receives the sharing control authority.

10. The data format as claimed in claim 8, wherein the request rejecting message receiver receives the message rejecting the request for the sharing control authority when a SIFS elapses after the request message broadcaster broadcasts the sharing control authority requesting message.

11. The station as claimed in claim 6, wherein the first controller controls the sharing of the wireless hybrid resources when no other station among the stations has the sharing control authority.

12. A controller for generating a data format for use in a station for performing wireless hybrid resources sharing using a method for sharing wireless hybrid resources among stations in a wireless independent network, the controller generated data format comprising:
a control authority requesting message, which requests sharing control authority by a distributed coordination method;
a control authority releasing message, which releases the sharing control authority; and
a plurality of transmission frames, which are spaced apart from the control authority requesting message and the control authority releasing message, respectively, by a PIFS, are also spaced apart from each other by one PIFS, and have variable lengths, respectively.

13. The data format as claimed in claim 12, wherein each of the transmission frames comprises:
a downlink section in which real-time service-related data is transmitted to another station and which has a variable length;
a polling section in which the other station related to the real-time service is polled and which has a variable length; and
a distribution control section in which non-real-time service-related data is transmitted to another station and which has a variable length.

14. The data format as claimed in claim 13, wherein the downlink section is spaced apart from the polling section by a PIFS.

15. The data format as claimed in claim 13, wherein the polling section is spaced apart from the distribution control section by a DIFS.

16. The data format as claimed in claim 13, wherein the downlink section comprises a plurality of packets which are spaced apart from each other by a PIFS.

* * * * *